(12) United States Patent
Zhuge et al.

(10) Patent No.: US 11,287,351 B2
(45) Date of Patent: Mar. 29, 2022

(54) VIBRATION VISUALIZATION WITH REAL-TIME AND INTERPOLATION FEATURES

(71) Applicant: Crystal Instruments Corporation, Santa Clara, CA (US)

(72) Inventors: James Q. Zhuge, Palo Alto, CA (US); Weijie Zhao, Los Gatos, CA (US); Aakash Umesh Mange, Santa Clara, CA (US)

(73) Assignee: Crystal Instruments Corporation, Santa Clara, CA (US)

( * ) Notice: Subject to any disclaimer, the term of this patent is extended or adjusted under 35 U.S.C. 154(b) by 259 days.

(21) Appl. No.: 16/690,570

(22) Filed: Nov. 21, 2019

(65) Prior Publication Data
US 2021/0156760 A1    May 27, 2021

(51) Int. Cl.
| | | |
|---|---|---|
| G01M 7/00 | (2006.01) |
| G06T 17/20 | (2006.01) |
| G06T 13/20 | (2011.01) |
| G01M 17/007 | (2006.01) |
| G01M 7/02 | (2006.01) |

(Continued)

(52) U.S. Cl.
CPC ............. *G01M 7/00* (2013.01); *G01M 5/005* (2013.01); *G01M 5/0066* (2013.01); *G01M 7/025* (2013.01); *G01M 17/007* (2013.01); *G06T 13/20* (2013.01); *G06T 17/20* (2013.01); *G06T 19/20* (2013.01); *G06T 2219/2012* (2013.01)

(58) Field of Classification Search
CPC ........ G01M 7/00; G01M 7/025; G01M 7/007; G01M 5/005; G01M 5/0066; G06T 19/20; G06T 17/20; G06T 13/20; G06T 2219/2012
See application file for complete search history.

(56) References Cited

U.S. PATENT DOCUMENTS

| | | |
|---|---|---|
| 3,952,150 A | 4/1976 | Gerardin et al. |
| 5,822,450 A | 10/1998 | Arakawa et al. |
| 7,689,385 B2 | 3/2010 | Shen |

(Continued)

OTHER PUBLICATIONS

Schulz, Martin, Thomas Reuding, and Thomas Ertl. "Analyzing engineering simulations in a virtual environment." IEEE computer Graphics and Applications 18.6 (1998): 46-52. (Year: 1998).*

*Primary Examiner* — Daniel F Hajnik
(74) *Attorney, Agent, or Firm* — Mark Protsik; Thomas Schneck (57) ABSTRACT

A vibration testing system for structures visually displays vibration analysis information in the form of a graphic animation using a 3D model of the object. While only a subset of the surface points of the object model correspond to sensors on the structure, an interpolation feature of the system allows deformation information for all points of the model to be estimated. Interpolation weights can be calculated in advance to allow for real-time display of a test. Color can be used to enhance visualization of vibration amplitudes. The visualization can be performed offline after a vibration test has been completed to show modal analysis results or can be done in real-time using either blocks or RMS data obtained while the vibration testing is still ongoing. This is especially useful for adjusting test parameters, such as the excitation location, amplitude or both, for more effective testing.

17 Claims, 5 Drawing Sheets

(51) Int. Cl.
*G01M 5/00* (2006.01)
*G06T 19/20* (2011.01)

(56) References Cited

U.S. PATENT DOCUMENTS

| | | | |
|---|---|---|---|
| 9,063,030 B2 | 6/2015 | Slemp | |
| 9,453,760 B2 | 9/2016 | Lysen | |
| 10,117,640 B2 | 11/2018 | Salcudean et al. | |
| 10,451,416 B1* | 10/2019 | Wu | G01M 5/0008 |
| 2006/0102413 A1* | 5/2006 | Ootani | B60R 21/0136 |
| | | | 180/274 |
| 2012/0031193 A1* | 2/2012 | Adams | G01M 17/08 |
| | | | 73/804 |
| 2012/0143516 A1* | 6/2012 | Mezic | G05B 15/02 |
| | | | 702/24 |
| 2012/0188105 A1* | 7/2012 | Alkhalaf | B60R 16/0232 |
| | | | 340/989 |
| 2016/0267664 A1* | 9/2016 | Davis | G06T 7/251 |
| 2017/0076494 A1* | 3/2017 | Gabrys | G06F 30/00 |

* cited by examiner

VIBRATION VISUALIZATION WITH REAL-TIME AND INTERPOLATION FEATURES

TECHNICAL FIELD

The present invention relates to vibration testing and modal analysis of structures, and more particularly relates to presentation of vibration analysis data resulting from such tests.

BACKGROUND ART

It is difficult to imagine the actual vibration level and distribution from a numerical display that is basically a mathematical representation of measured signals of a vibration experienced by a structure under test. Animating the structure's deformation helps to get a better picture of the intensity of vibration. A contour scale which graphically displays the magnitude of vibration on the structure using a color plot helps in visualizing which areas of the test unit is experiencing maximum and minimum magnitude of the vibrations. A 3D geometry model of the structure under test is required to animate the vibration it is experiencing. It is tricky to create a 3D model of intricate geometries because of the complexity involved in measuring the geometric coordinates of anything but the simplest forms of test article and then using this information to generate a model with lines and surfaces.

SUMMARY DISCLOSURE

Animation of structural vibrations is provided to enable visualization of a structure's vibrational modes and amplitudes. This can display offline (after measurements are completed) of both operational deflection shapes in a time domain or mode shapes in a frequency domain of the structure under test. But it can also display online (in real time while the test is still running) the operational deflection shapes using block or RMS data. The vibration visualization also includes interpolation to calculate estimated structural deformations at various locations between the vibration measurement sensors.

In a structural vibration animation embodiment in accord with the present invention, a geometric surface model of the structure to be tested is first created using a geometry model editor. The model, e.g. a list of point coordinates on the structure's surface, can be stored in a structure library. Motion sensors are attached to the modeled structure at a set of measurement locations that correspond to a selected subset of points in the model, and these locations are recorded in a channel table. A vibration test of the structure is performed, wherein a vibration exciter for applying a vibration stimulus to a selected point or points on the structure, and motion data is received from each sensor as the structure vibrates. At each measurement location, the motion data is analyzed by a digital signal processor and related analysis software to determine structural deformations. Additionally, the analysis includes an interpolation process to calculate structural deformations at locations between the sensors. Both the measured and interpolated structural deformations are mapped onto the geometric surface model, which forms the basis for a visualization or display of the mapped structural deformations. The vibration visualization appears on a computer display in any of several view modes (e.g. a perspective of the structure with vibration amplitudes represented in color). Preferably, the display will also highlight the vibration stimulation location(s) and the set of measurement locations.

For the interpolation, a natural neighbor interpolation can be used based on inverse distance weighting. That is, for each point in the geometric model that does not correspond to a measurement location, a set of two or more nearest measurement locations are identified and a set of interpolation weights are established for those measurement locations, with closer measurement locations receiving relatively higher weights than farther measurement locations. During the analysis of the motion data, the various predetermined weights are applied to the determined structural deformations of corresponding measurement locations and then combined to obtain interpolated structural deformations for each non-measurement location.

An important feature of the invention is that the structure's vibration can be animated in real-time. While the vibration test is on-going, the motion data from the sensors is analyzed and structural deformations are mapped onto the geometric surface model for display. The display may show deformation amplitudes at each point of the surface model, or alternatively could display slow-motion animation of deformations for selected time blocks which can be updated as new motion data comes in.

The vibration visualization approach of the present invention not only helps in overcoming the difficulty of producing 3D geometries of any complicated models with a simple procedure but also animates the structure's deformation which makes it possible to visualize the vibration experienced by the testing article during a vibration test.

DETAILED DESCRIPTION

Figure 1:
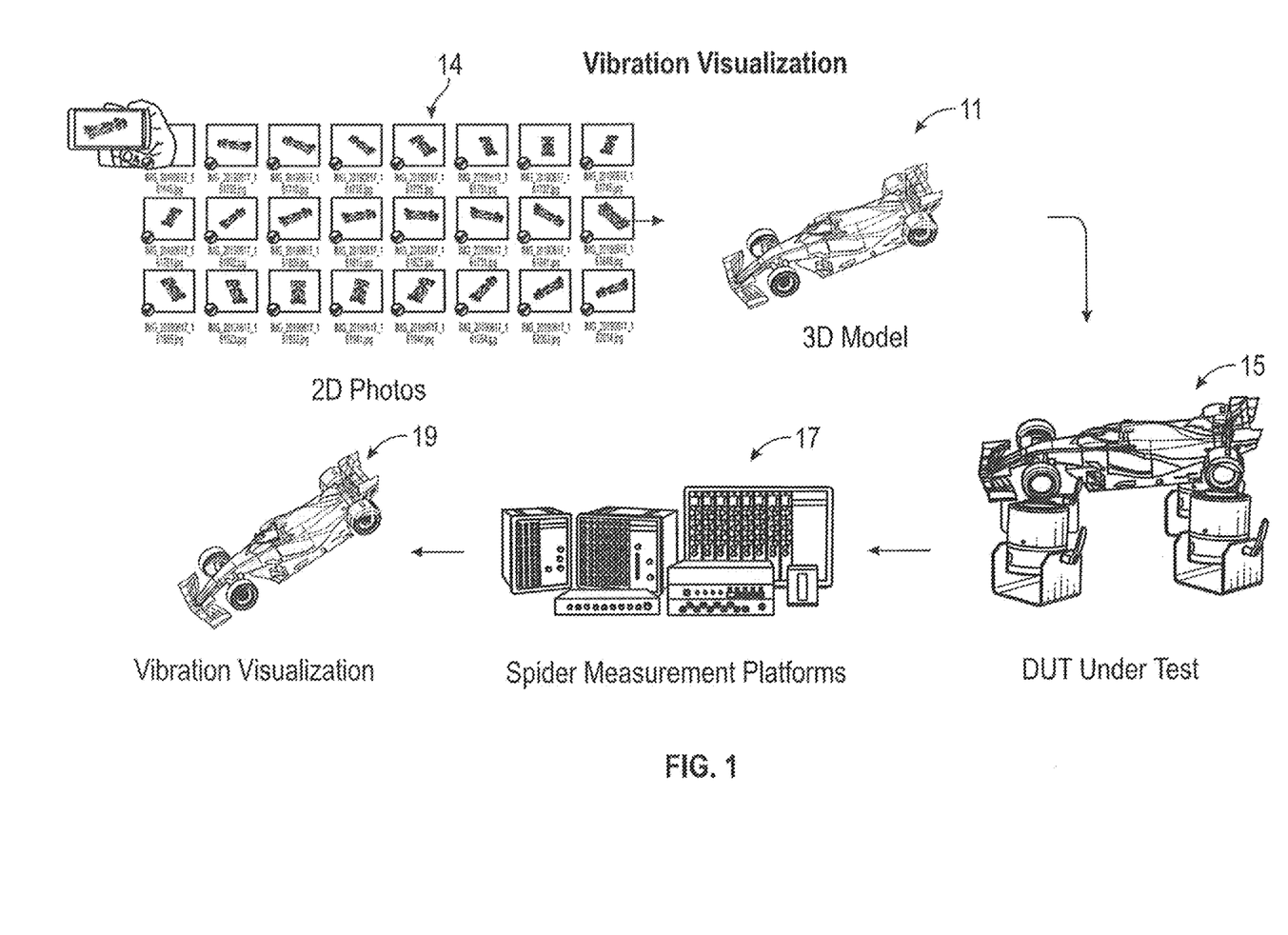
FIG. 1 is a block diagram illustrating a sequence of steps for creating the vibration visualization of an object being tested.
Figure 2:
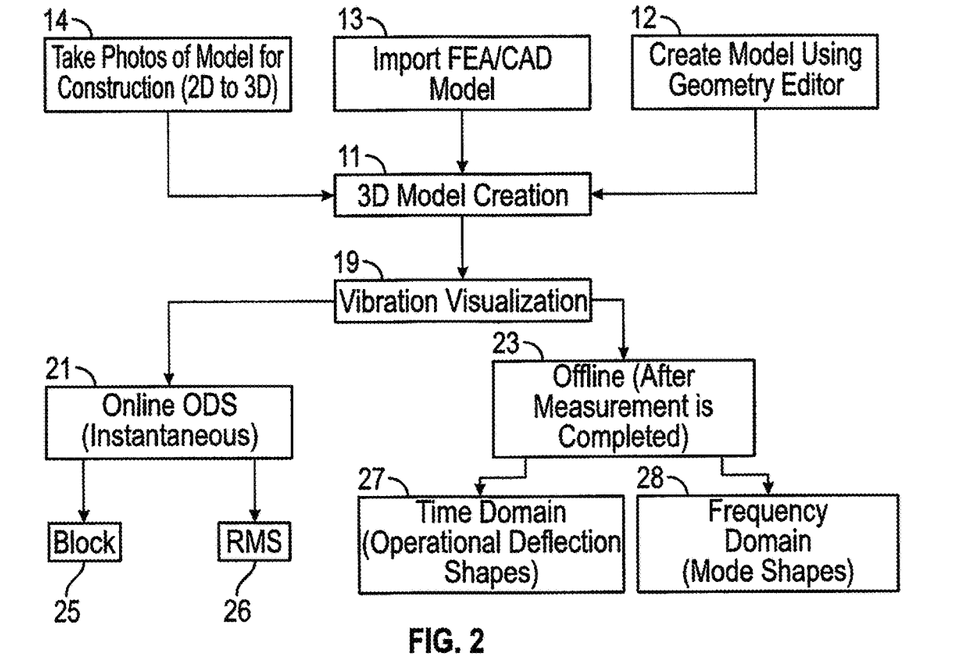
FIG. 2 is a block diagram illustrating different available options for 3D model creation and vibration visualization in accord with the present invention.

As illustrated in FIGS. 1 and 2, a basic overview of the process begins with the construction and importation of a real 3-dimensional model 11 of an object to be tested, for example by the conversion of a series of 2-dimensional photos 14 taken from a smartphone or camera. Alternatively, the 3D model 11 may be created from finite element analysis 13 using computer-aided design software. Still further, if the object is simple enough it would be possible to directly enter 3D coordinates 12 using a geometry editor to create the model. Once the model 11 becomes available, the object is then put under vibration test 15. Using measurement data 17 obtained from the test and analyzed, the vibration can be visualized 19 using the 3D model.

With reference to FIG. 2, the vibration visualization 19 of the 3D model can be performed in real-time 21 while the measurement is still going on, or offline 23 after the measurement is completed. The real-time animation 21 can use point 25 or root-mean-square (RMS) 27 data of the input channels (sensors) to display the deformation of the test article during the vibration test. The offline vibration data 23 can be visualized in the time domain 27 as well as the frequency domain 28. The time domain animation 27 would show the combined effect of all the modes whereas the frequency domain animation 28 uncouples the modes and shows the effect of vibration mode at the respective frequency.

3D Geometry Model for Vibration Visualization

Vibration Visualization will create a visual effect to represent the intensity and distribution of vibration of a real structure on a 3D geometry model. There are three ways of generating a three-dimensional geometry model of the structure under test: 1) create a 3D model using a geometry editor; 2) import an FEA/CAD model; and 3) take 2D photos of the test object for construction of a 3D model.

1) Geometry Model Creation

If the model is simple enough, a user can take a conventional bottom-up approach and directly input the (x,y,z) coordinates of the mesh structure and join these points using lines and surface to create a 3D mesh model. This method is the classical way for geometry modeling and is fully functional in the vibration visualization software. However, it is often quite difficult to extend this approach to complex structures, as this would require a lot of manual work in not only measuring the coordinates of the mesh but in the whole creation process. Other drawbacks are it requires a lot of human efforts and takes long time.

2) FEA/CAD Model Import

A second approach is importing a finite element analysis/computer-aided design (FEA/CAD) model into the geometry editor. This method is simpler than creating a 3D geometry model from scratch but requires some technical expertise. The generated model has good accuracy because of high number of points for different features of the structure but is more expensive and time consuming than a 2D-to-3D reconstruction approach. A variety of commonly used FEA/CAD model formats can be supported for importation of the resultant 3D model into the vibration visualization software.

3) 2D to 3D Reconstruction Using Photos

Engineering data management software can provide 2D-to-3D reconstruction to enable a solution to the intricacies of creating 3D geometric models of convoluted test structures. This approach not only saves time and efforts of the user but also provides an accurate model with great simplicity. The user just takes a bunch of photos of the test article and feeds it into the software. These images are matched to extract the features and a 3D model of the structure is constructed after point and surface reconstruction processes. This method is extremely easy to use, does not require any manual labor and is much quicker than the other two approaches. The following steps briefly explain the working principle behind the 2D-to-3D reconstruction procedure.

Figure 3:
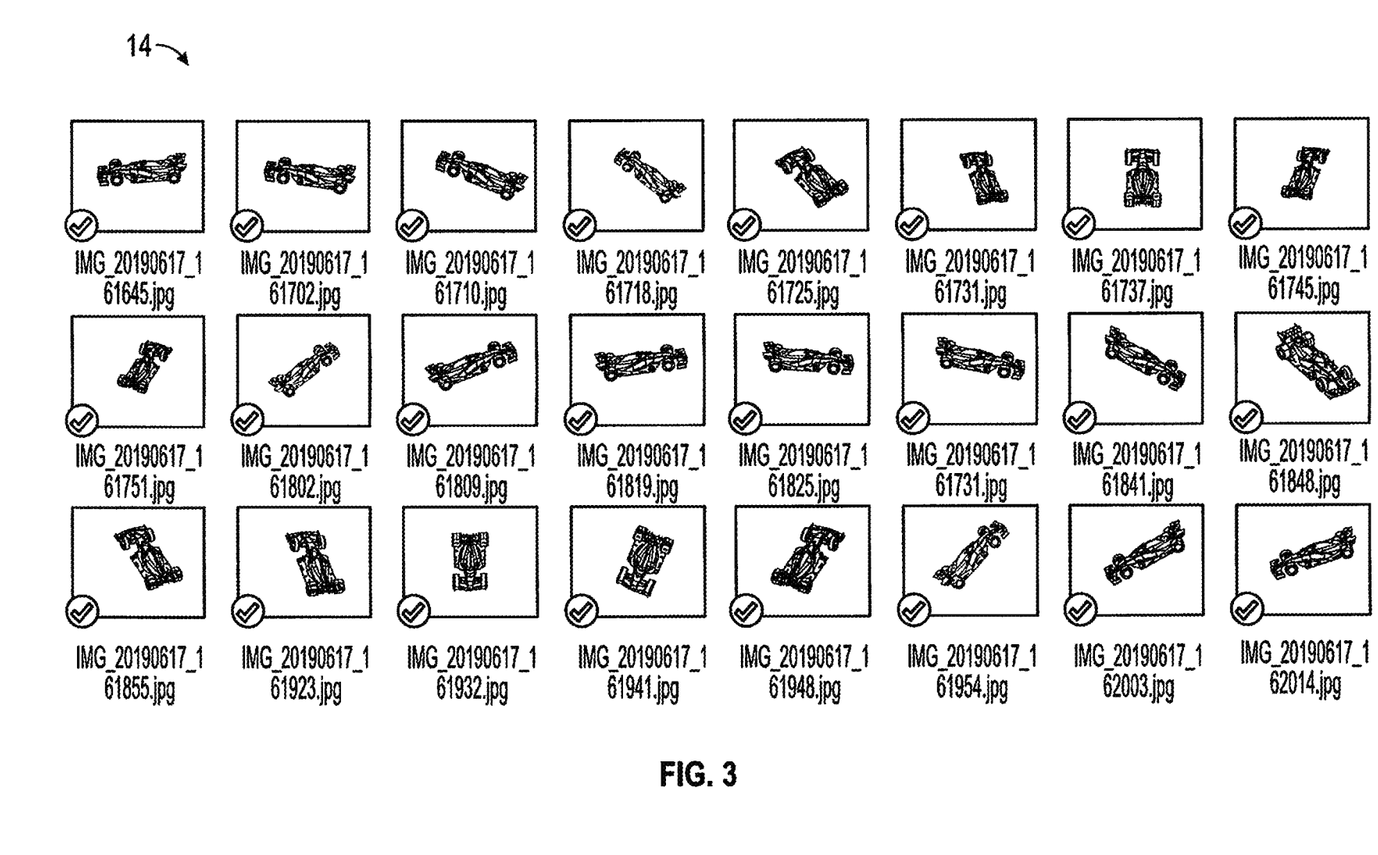
FIG. 3 is a set of 24 2D perspective images taken of an object (here in the form of a model car) from different angles for use in 3D model creation according to one available option of the present invention.

As seen in FIG. 3, the user takes a set of two-dimension photos 11 while going around the object to be tested. The photos can be taken using a smartphone or a camera. To obtain an accurate 3D model it is suggested that the user take perspective photos at a known azimuth angle above the object, e.g. at about every 15 degrees, which corresponds to approximately 24 photos of the test object. If all sides of an object, including the underside, are deemed to be needed for any reason, image directions informed, e.g., by vertices of a regular polyhedron might be used to select the image set. It should be noted that increasing the number of photos beyond about 30 would improve the accuracy of the model but might take more processing time.

Using the captured photos, the 2D-to-3D reconstruction proceeds in software to 1) loading the images, 2) feature extraction, 3) sparse reconstruction, followed by 4) dense reconstruction, and finally 5) surface reconstruction.

The set of 2D photos are imported into the reconstruction software in order to match the images and extract the features. The photo set may be visible as display icons together with basic textual identifying information regarding each image (assigned image number, file name, camera angle, etc.)

Based on the triangulation principle, two corresponding photos are used to determine the depth of the test object. A regular 15-degree interval helps in obtaining optimal overlap between consecutive images which further improves the feature matching or corresponding image pixels. CCD width can be determined from the number of pixels in the photo and the focal length of the camera. A higher number of pixels and larger CCD size implies a better resolution of the photo. The image scale of each image indicates whether any of the photos need to be rescaled to complete the feature matching process. The software may allow a user to enter the CCD width or related camera data, or even manually specify an initial image scale for each file. A default match ratio of 0.6 normally should be enough to obtain a good match between the images. This is a suitable balance between good image matching and fast feature extraction process. For each image, a set of feature matches may be identified and recorded in pixels of corresponding adjacent images.

Detecting the key features from the images helps in creating a sparse point model of the test structure. Once the corresponding features have been matched, their 3D coordinates can be determined to allow construction of a sparse model of the object. This is a fast and rough model creation before the constructed point geometry is fine tuned in the dense point reconstruction procedure. The initial image pairs to begin the spare point model reconstruction can be automatically chosen by the software.

More information from the feature extraction and sparse point reconstruction can be used to generate a dense point 3D model. A complete 3D model is produced in the surface reconstruction stage by automatically joining all the points in the penultimate dense point model.

Figure 4:
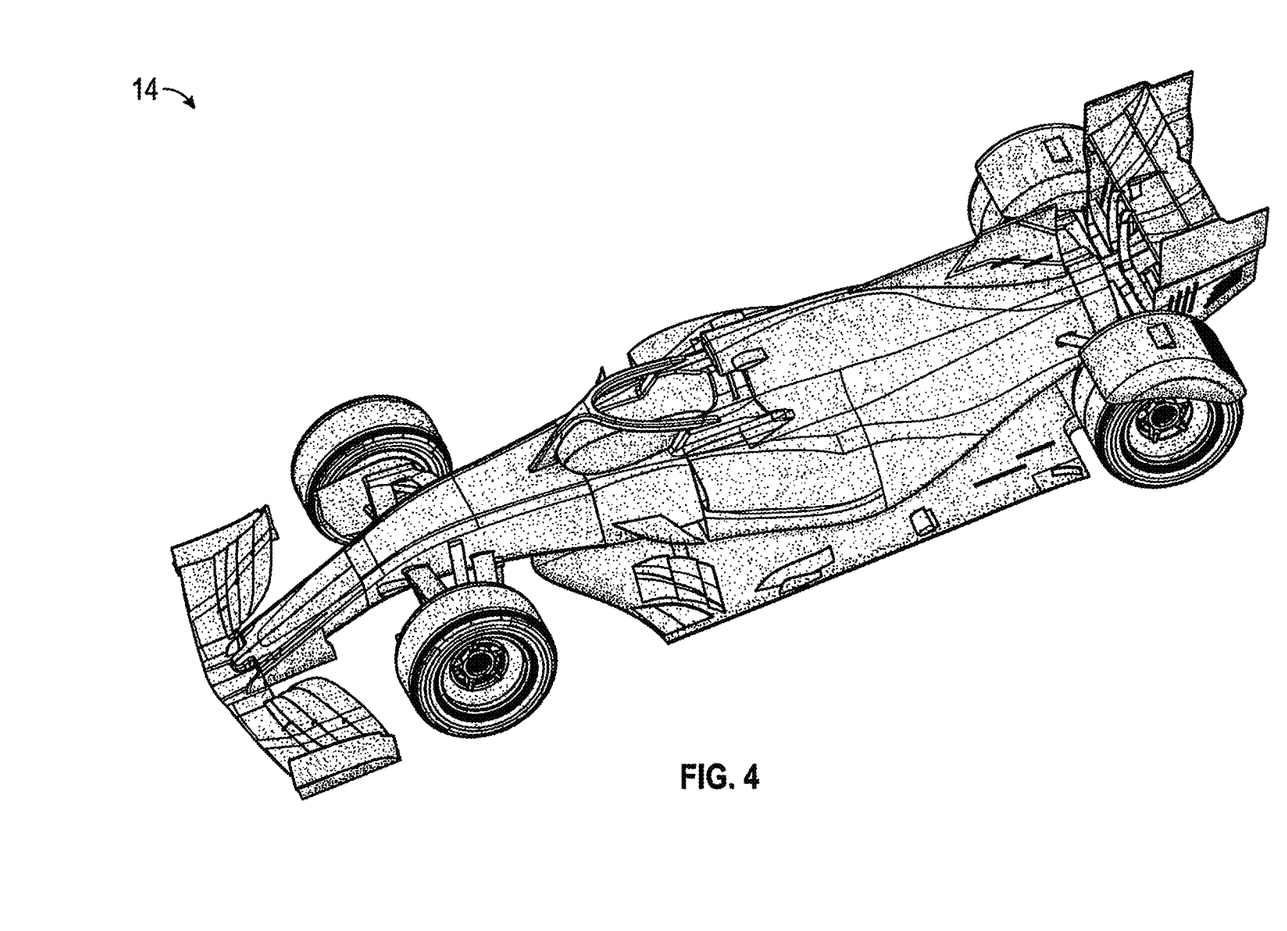
FIG. 4 is a perspective view of a completed 3D model of the object from FIG. 3 being displayed by the vibration visualization system of the present invention.

With reference to FIG. 4, once the 3D model is in the geometry editor, various features in the software can be used to trim and modify certain sections of the 3D model to improve the aesthetics of the geometric model. In the figure, the model used was a race car model, wherein photos were taken while the car was situated on a floor. The floor thus appeared in the background of each image and was also extracted by the reconstruction software as a matched "feature". Thus, one typical operation is to manually remove the "floor" from the above race car model, since the user knows that it is not actually part of the object.

The resultant model can then be exported to a selected data file format, which can subsequently be imported into any of engineering data management (EDM) modal testing and analysis, vibration control system (VCS) or dynamic signal analysis (DSA) software for the vibration visualization application.

Whichever of the above three methods are used to construct the 3D model, once imported, it can be used to visualize the vibration of the test structure either in real-time (Online ODS) when the measurement is going on, or, post-process (time domain and frequency domain) after all the measurement runs have been completed. This is discussed in detail in the next section.

Vibration Visualization in Real Time or Post Processing

Using the 3D model created from any of the above methods, the vibration visualization can be carried out while the vibration test or analysis is ongoing, or after the vibration data is saved or recorded. After attaching sensors onto the test structure at different measurement points, a vibration test is carried out. The data acquired at these sensor locations is used to animate the vibration of the 3D model at these measurement points.

The measured data set can be used to perform global interpolation and calculate the deformation of the unmeasured points spread across the entire structure. This greatly simplifies the process of measuring data at all the points. Vibration visualization feature collectively provides the animation of the test structure at these points on the constructed 3D model.

1) Real-Time (Online ODS) Visualization

Once a 3D model is available, the data from the signals can be used to animate the instantaneous deformation of the structure. A deformation animation of the operational deflection shapes of the structure under test is displayed. Information from this vibration visualization and the contour plot scale can be used to optimize the location of sensors as the user knows which section of the testing article has higher or lower deformation. Similarly, this knowledge can also be used to change the excitation location to obtain optimal response at the desired locations. This information can also be used to modify the control profile for the test article by reducing the test level in order to prevent any damage to the structure.

The real-time vibration visualization feature can use either block or RMS data from the input channels to animate the deformation experienced by the test structure at these sensor locations. The block data is useful for a more instantaneous display of vibration visualization of the structure under test. The animation is updated every 40 milliseconds when a new block data received from the sensors is used for visualizing the vibration of the test article. While the block option has a faster update, the vibration visualization of the test structure might not be able to reach maxima or minima deformation. RMS evaluations would be performed over some pre-defined time duration. The RMS option displays the RMS data of each time block and is more useful to observe which measurement points have the maximum or minimum deformation.

2) Offline (Post-Measurement) Visualization

Vibration visualization is not only useful in real time (Online ODS) where a user can see the instantaneous deformation of the structure but is also helpful after the completion of measurements. The measured data can then be analyzed and visualized to observe the test structure's vibration in both time and frequency domain. Performing a Fast Fourier Transform upon a time stream of the motion data can obtain corresponding motion data in a frequency domain.

Figure 5:
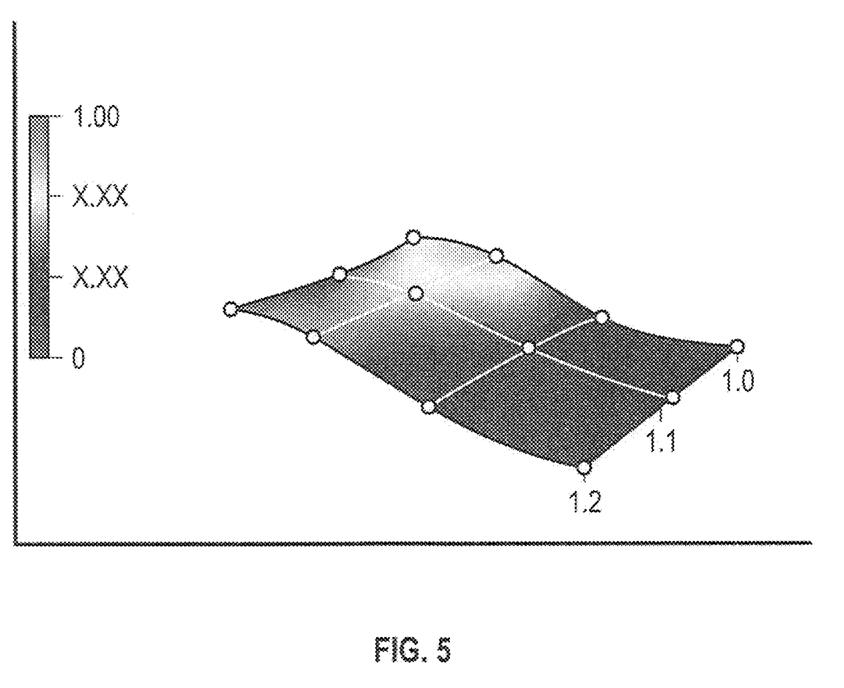
FIG. 5 is a perspective view illustrating a vibration visualization with different colors (here shades) for different displacement amplitudes of an object (here, in the form of a sheet being excited).

The offline time domain data replays the vibration measured at each time instant during the test (e.g. in slow motion). This is more useful to monitor the entire structure's response through the complete excitation event. To aid visualization, the object may be displayed with different colors that indicate the amount of deviation from each point's original undeflected position, as seen for example in FIG. 5.

Vibration visualization of offline frequency domain data shows the mode shapes of the test structure at the associated natural frequencies. The animation of these mode shapes further guides in better understanding the dynamic response of the test structure to the input excitation. This information can be used to improve the mechanical characteristics of the test object. The damping of the test structure can be adjusted accordingly to reduce the dominance of certain modes. To aid interpretation, the object may be displayed using different colors indicating, e.g. the vibration amplitude (maximum deviation) of each point on the object, or other modal information.

Interpolation

The three-dimensional geometric model requires huge number of points for accuracy, but it makes it difficult for the user to have such huge number of measurement points. The global interpolation feature in our software saves the user a lot of time and efforts. The user sets up the test, establishes connection and collects data only for a reasonable number of measurement points and this information is then used to interpolate and calculate the deformation of the unmeasured points spread across the entire structure. The information from the current test can be used to optimize the future tests by playing around with the configuration settings, test setup etc.

The test structure is geometrically modeled as a three-dimensional mesh of discrete points, but only a subset of these points is actually measured by sensors during a vibration test. There may be M non-measured points and N measured points out of a total of M+N points in the geometric model of the structure. Having a high number M+N of points in the model (e.g., on the order of $10^5$ points) helps produce an accurate visualization of the structure, but that many points cannot possibly be directly measured. Instead, global interpolation is used to calculate estimated vibration data for the M non-measured points using the dataset of the N measured points. Then with all the non-measured points calculated, realistic animation of the vibration can be displayed in useful ways.

A variety of interpolation techniques could be used. The geometric model presents a triangulated irregular network or three-dimensional mesh wherein the distributed nodes or points of the network or mesh are associated with a corresponding set of three-dimensional coordinates, such as (x,y, z) rectilinear coordinates. The N measurement locations form a selected subset of all the points available. For the M non-measurement locations, natural neighbor interpolation can be used based on inverse distance weighting. In one embodiment, distances $d(x,x_i)$ between a non-measured point x and two or more closest measured points $x_i$ are calculated from their geometric model coordinates. For each non-measured point x, interpolation weights $w_i(x)$ are assigned to the various closest measurement points $x_i$, with higher weighting assigned to the measurement points that are closer, $$w_i(x)=d(x,x_i)^{-p}, \text{ where } p \text{ is a positive real number}$$

called the power parameter. A power parameter p of 4 may be chosen, so that weights correspond to the fourth power reciprocal of the distance. Weights can be precalculated prior to the vibration testing, along with the geometric model creation and sensor location selection.

The sum of weighted vibration levels of those selected "close" measured points (or even all measured points; but some are so far away a given point that their weighted values become negligible) can be calculated to create a weighted average that serves as an interpolated estimate of the vibration level for each non-measured point. With vibration values at all non-measured points calculated, the animation of the global vibration is possible.

Such interpolation calculations are typically conducted based on instantaneous displacement values of the measured points. Alternatively, if the vibration at measured points can be deconstructed into amplitudes and phases of its various modes, the interpolation might instead be based on separate weighted averages of the component amplitude and phase values; but the calculations involved are likely too complex for any but offline post processing after the vibration test is completed, and except in rare instances are unlikely to contribute much added value to the visualization.

What is claimed is:

1. A vibration test animation system, comprising:
   a geometry model editor for creating a three-dimensional geometric surface model of a structure to be tested from a set of two-dimensional perspective images at known image directions around the structure using triangulation of matching features in overlapping portions of adjacent images, the created model being stored in a structure library;
   a set of motion sensors attachable to the structure to be tested at measurement locations that correspond to a selected subset of points in the model, the measurement locations being stored in a channel table;
   a vibration exciter for applying a vibration stimulus to a selected point on the structure to be tested, each sensor providing motion data while the structure is being vibrated;
   a digital signal processor for receiving the motion data from each sensor and analyzing the motion data to determine structural deformations at each measurement location on the structure being vibrated, the analyzing also including interpolation to calculate structural deformations at locations between the sensors using the model stored in the structure library, such that measured and interpolated structural deformations are mapped onto corresponding geometric surface model, the interpolation being based on inverse distance weighting with closer measurement locations receiving relatively higher weights than farther measurement locations; and
   a computer display device receiving the mapped structural deformations to provide a visualization of the structure being vibrated.

2. A method for animating structural vibrations, comprising:
   creating a three-dimensional geometric surface model of a structure to be tested, the model comprising a list of coordinates stored in a structure library of discrete points on a surface of the structure;
   attaching motion sensors to the structure at a set of measurement locations that correspond to a selected subset of points in the model;
   for each point of the model not corresponding to a measurement location, identifying a set of two or more nearest measurement locations and establishing a set of interpolation weights for each of the identified locations, with closer measurement locations receiving relatively higher weights than farther measurement locations;
   performing a vibration test of the structure and receiving motion data from each sensor;
   analyzing the motion data to determine structural deformations at each measurement location, the analyzing also including interpolation to calculate structural deformations at locations between the sensors by applying the set of interpolation weights to the determined structural deformations of nearest measurement locations and combining to obtain interpolated structural deformation for non-measurement locations between the sensors;
   mapping the measured and interpolated structural deformations onto the geometric surface model; and
   displaying the surface model with a visualization of the mapped structural deformations.

3. The method as in claim 2, wherein applying interpolation weights is an inverse distance weighted interpolation with a chosen power parameter, the interpolation being applied to structural deformation amplitudes at the set of nearest measurement locations.

4. The method as in claim 2, wherein the measurement locations are highlighted in the visualization.

5. The method as in claim 2, wherein the analyzing, mapping and displaying are performed in real time while the vibration test is running.

6. The method as in claim 2, wherein the analyzing, mapping and displaying are performed offline after the completion of the vibration test.

7. The method as in claim 6, wherein the applying of interpolation weights is carried out offline by deconstructing measured vibrations at each measurement location into amplitudes and phases of various vibration modes and applying the interpolation weights separately to component amplitude and phase values.

8. The method as in claim 2, wherein blocks of motion data in the time domain are analyzed.

9. The method as in claim 2, wherein the displaying shows a slow-motion animation of deformation for selected time blocks.

10. The method as in claim 2, wherein analyzing includes performing a Fast Fourier Transform upon a time stream of the motion data to obtain motion data in a frequency domain.

11. The method as in claim 2, wherein analyzing of motion data includes root-mean-square evaluation over a pre-defined time duration.

12. The method as in claim 2, wherein the displaying shows deformation amplitudes at each point of the surface model.

13. The method as in claim 2, wherein the displaying shows selected mode shapes upon the surface model.

14. The method as in claim 2, wherein the three-dimensional geometric surface model of a structure to be tested is created from a set of two-dimensional perspective images at known image directions around the structure using triangulation of matching features in overlapping portions of adjacent images and storing the created model in a structure library.

15. A method for animating structural vibrations, comprising:
   creating a three-dimensional geometric surface model of a structure to be tested from a set of two-dimensional perspective images at known image directions around the structure using triangulation of matching features in overlapping portions of adjacent images and storing the created model in a structure library;
   attaching motion sensors to the structure at a set of measurement locations that correspond to a selected subset of points in the model;
   for each point of the model not corresponding to a measurement location, identifying a set of two or more nearest measurement locations and establishing a set of interpolation weights for each of the identified locations, the interpolation being based on inverse distance weighting with a chosen power parameter, with closer measurement locations receiving relatively higher weights than farther measurement locations, the weights for the identified locations being precalculated and stored prior to vibration testing;

performing a vibration test of the structure and receiving motion data from each sensor; and while the vibration test is still on going, analyzing the motion data in real-time to determine structural deformations at each measurement location and interpolated structural deformations by applying the precalculated weights at the identified locations between measurement locations, mapping both the measured and interpolated structural deformations onto the geometric surface model, and displaying the surface model with a visualization of the mapped structural deformations.

16. The method as in claim 15, wherein analyzing includes performing a Fast Fourier Transform upon a time stream of the motion data to obtain motion data in a frequency domain.

17. The method as in claim 15, wherein the displaying shows deformation amplitudes at each point of the surface model.

* * * * *